United States Patent
Chang et al.

(10) Patent No.: US 7,787,394 B2
(45) Date of Patent: *Aug. 31, 2010

(54) NETWORK STATUS DISPLAY DEVICE AND METHOD USING TRAFFIC FLOW-RADAR

(75) Inventors: Beom Hwan Chang, Daejeon (KR); Jung Chan Na, Daejeon (KR); Geon Lyang Kim, Daejeon (KR); Dong Young Kim, Daejeon (KR); Jin Oh Kim, Daejeon (KR); Hyun Joo Kim, Seoul (KR); Hyo Chan Bang, Daejeon (KR); Soo Hyung Lee, Daejeon (KR); Seon Gyoung Sohn, Daejeon (KR); Jong Soo Jang, Daejeon (KR); Sung Won Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 755 days.

This patent is subject to a terminal disclaimer.

(21) Appl. No.: 11/599,909

(22) Filed: Nov. 15, 2006

(65) Prior Publication Data

US 2007/0206498 A1 Sep. 6, 2007

(30) Foreign Application Priority Data

Nov. 17, 2005 (KR) ............... 10-2005-0110358

(51) Int. Cl.
*H04L 12/66* (2006.01)
*G01R 31/08* (2006.01)
*H04W 36/00* (2009.01)

(52) U.S. Cl. ............... 370/253; 370/352; 370/216; 455/444

(58) Field of Classification Search ............... 370/242, 370/247, 252, 253, 216, 217, 218, 220, 465, 370/466; 714/25, 53, 799; 726/23, 24, 25, 726/22, 26, 3, 4, 5, 6, 13, 27, 28, 29; 713/187, 713/188; 455/444, 445

See application file for complete search history.

(56) References Cited

U.S. PATENT DOCUMENTS

| | | | | |
|---|---|---|---|---|
| 5,621,664 A | * | 4/1997 | Phaal | 702/57 |
| 6,853,388 B2 | * | 2/2005 | Ueno et al. | 715/736 |
| 7,203,596 B2 | * | 4/2007 | Ledingham et al. | 701/120 |
| 7,356,689 B2 | * | 4/2008 | Burch et al. | 713/153 |
| 7,363,656 B2 | * | 4/2008 | Weber et al. | 726/23 |
| 7,607,170 B2 | * | 10/2009 | Chesla | 726/22 |
| 2007/0074288 A1 | * | 3/2007 | Chang et al. | 726/22 |

FOREIGN PATENT DOCUMENTS

KR 10-2004-0072365 2/2003

OTHER PUBLICATIONS

Kim, H., et al., "Real-time Visualization of Network Attacks on High-Speed Links." Sep./Oct. 2004. *IEEE Network* 0890-8044/04, pp. 2-12.

* cited by examiner

*Primary Examiner*—Hanh Nguyen
(74) *Attorney, Agent, or Firm*—Ladas & Parry LLP

(57) ABSTRACT

A network status display device using a traffic flow-radar is provided. The network status display device includes: a traffic feature extractor calculating flow occupancy rates for total flows, micro-flows and macro-flows with respect to each of a plurality of traffic features with reference to traffic information for each traffic feature such as a network address, a port, a transmitting/receiving host address or a protocol collected by an external traffic information collector, and storing the calculation result; a traffic status display unit displaying the flow occupancy rates for each traffic feature calculated and stored in the traffic feature extractor on a radar with dots for each traffic feature; and a traffic anomaly determination unit determining whether a network status is abnormal with reference to the radar for each traffic feature, detecting and reporting the type of the abnormal network status and harmful or abnormal traffic that generates the abnormal network status, when the abnormal status occurs.

10 Claims, 6 Drawing Sheets

NETWORK STATUS DISPLAY DEVICE AND METHOD USING TRAFFIC FLOW-RADAR

CROSS-REFERENCE TO RELATED PATENT APPLICATION

This application claims the benefit of Korean Patent Application No. 10-2005-0110358, filed on Nov. 17, 2005, in the Korean Intellectual Property Office, the disclosure of which is incorporated herein in its entirety by reference.

BACKGROUND OF THE INVENTION

1. Field of the Invention

The present invention relates to a network security system, and more particularly, to a network status display device and method which facilitate recognizing a current network status by extracting and analyzing traffic features and displaying abnormal or harmful traffic capable of deteriorating network performance.

2. Description of the Related Art

In general, an abnormal network status is displayed by using one of a plurality of network traffic items such as network addresses, protocols, ports, packets, and so on. It is difficult to detect a traffic anomaly for a predetermined service and to display a traffic anomaly of a large amount of data in real time. Since a displayed traffic status image or graph is very complex, additional analysis is needed in order to detect the anomaly of the corresponding traffic using software means. Therefore, in conventional methods of displaying a harmful traffic, a user generally detects a traffic anomaly of a predetermined service.

SUMMARY OF THE INVENTION

The present invention provides a network status display device and method using a traffic flow-radar capable of facilitating recognition of a current network status by evaluating respective flow occupancy rates for traffic features such as a network address, a host address, protocol, a port, and so on, analyzing harmful traffic or abnormal traffic that deteriorate network performance using software and displaying the analysis result.

The present invention also provides a computer-readable medium having embodied thereon a computer program for the above network status display method.

According to an aspect of the present invention, there is provided a network status display device using a traffic pattern map, the device including: a traffic feature extractor calculating flow occupancy rates for total flows, micro-flows and macro-flows with respect to each of a plurality of traffic feature with reference to traffic information for each traffic feature such as a network address, a port, a transmitting/receiving host address, or a protocol collected by an external traffic information collector, and storing the calculation result; a traffic status display unit displaying the occupancy rates of the flow for each traffic feature calculated and stored in the traffic feature extractor on a radar with dots for each traffic feature; and a traffic anomaly determination unit determining whether a network status is abnormal with reference to the radar for each traffic feature, detecting and reporting the type of the abnormal network status and a harmful or abnormal traffic that generates the abnormal network status, when the abnormal status occurs.

According to another aspect of the present invention, there is provided a network status display method using a traffic pattern map, the method including: (a) calculating flow occupancy rates for total flows, micro-flows and macro-flows with respect to each of a plurality of traffic feature with reference to traffic information for each traffic feature such as a network address, a port, a transmitting/receiving host address, or a protocol collected by an external traffic information collector, and storing the calculation result; (b) displaying the flow occupancy rates with respect to each traffic feature stored in (a) on a radar with dots for each traffic feature; and (c) determining whether a network status is abnormal with reference to the radar for each traffic feature, detecting and reporting harmful traffic or abnormal traffic that generates the abnormal network status.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
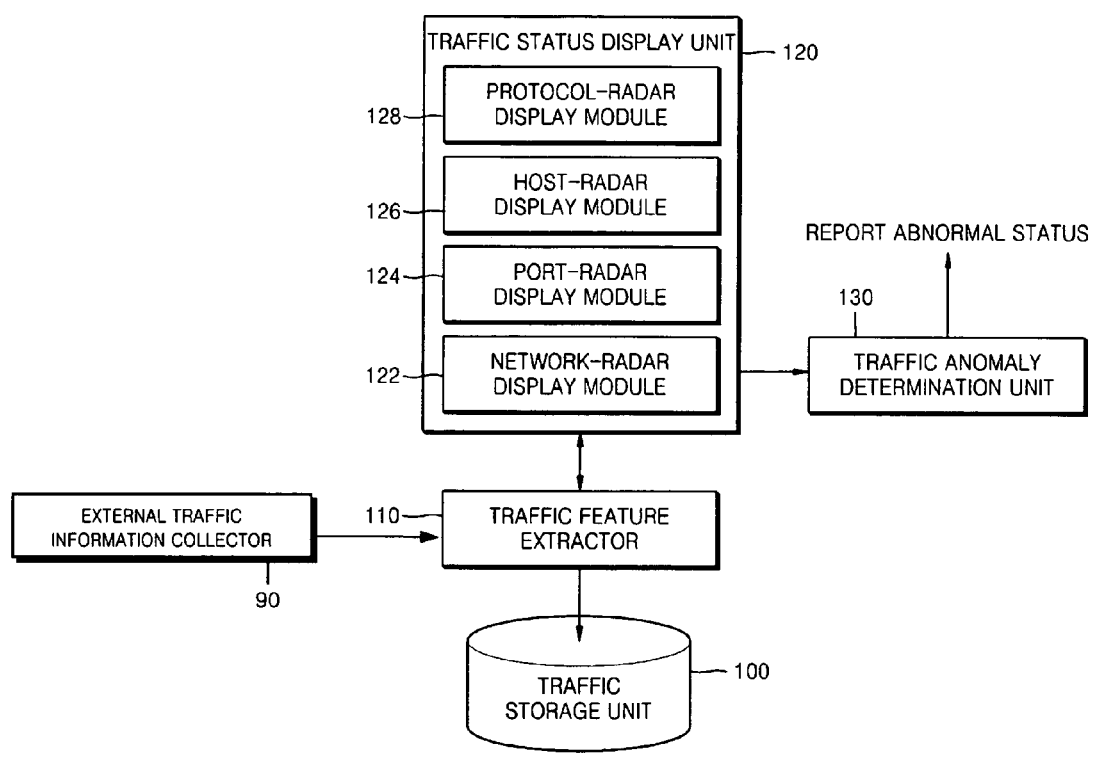
FIG. 1 is a block diagram showing a network status display device according to an embodiment of the present invention.

Hereinafter, the present invention will be described in detail by explaining embodiments of the invention with reference to the attached drawings. FIG. 1 is a block diagram showing a network status display device according to an embodiment of the present invention. Referring to FIG. 1, the network status display device using a traffic flow-radar includes a traffic feature extractor 110, a traffic status display unit 120 and a traffic anomaly determination unit 130.

In FIG. 1, the traffic feature extractor 110 refers to traffic feature, such as a network address, a port, a transmitting/receiving host address or protocol, etc., which is collected by an external traffic information collector 90 and stored in a traffic information storage unit 100, calculates occupancy rates for the total flows, micro-flows and macro-flows with respect to each traffic feature, and stores the calculated values.

The micro-flows of the total flows have a connection duration less than a predetermined reference connection duration (for example, 1 second), and the macro-flows of the total flows have a connection duration equal to or greater than a predetermined reference connection duration. Specifically, at first, the traffic feature extractor 110 calculates and stores flow occupancy rates for the total flows and the micro-flows with respect to address sections into which the network address is divided, total ports, total transmitting/receiving host addresses, and total protocols. The flow occupancy rates for the macro-flows with respect to each traffic feature are evaluated by subtracting the flow occupancy rates for the micro-flows with respect to each traffic feature from the flow occupancy rates for the total flows with respect to each traffic feature. On the other hand, abnormal or harmful traffic can be determined by only some flow occupancy rates with respect to the total ports, transmitting/receiving host addresses, and protocols having high occupancy rates. Accordingly, with regard to the total ports, the transmitting/receiving host addresses and protocols, the traffic feature extractor 110 may store the flow occupancy rates of the top N (>0) ports, the top M (>0) transmitting/receiving host addresses, and the top P (>0) protocols having high occupancy rates. Hereinafter, for the convenience of description, in cases of the total ports, the transmitting/receiving host addresses and protocols, the traffic feature extractor 110 is determined to store the flow occupancy rates of the top N (>0) ports, the top M (>0) transmitting/receiving host addresses, and the top P (>0) protocols having high occupancy rates.

The traffic status display unit 120 displays the flow occupancy rates for each traffic feature calculated and stored in the traffic feature extractor 110 with dots on the radial (radar) coordinate system, and the traffic status display unit 120 connects the displayed dots. Specifically, the traffic status display unit 120 includes a network-radar display module 122, a port-radar display module 124, a host-radar display module 126, and a protocol-radar display module 128. At first, the network-radar display module 122 displays the flow occupancy rates for the total flows, the micro-flows, and the macro-flows on the network-radar coordinates with dots with reference to the flow occupancy rates stored in the traffic feature extractor 110, and the network-display module 122 connects the dots. The port-radar display module 124 displays the flow occupancy rates of the top N (>0) ports having high occupancy rates for the total flows, the micro-flows, and the macro-flows on the port-radar coordinates with dots with reference to the flow occupancy rates stored in the traffic feature extractor 110, and the port-radar display module 124 connects the dots. The host-radar display module 126 displays the flow occupancy rates of the top P (>0) transmitting host address and receiving host address having high occupancy rates for the total flows, the micro-flows, and the macro-flows on the host-radar coordinates with dots with reference to the flow occupancy rates stored in the traffic feature extractor 110, and the host-radar display module 126 connects the dots. The protocol-radar display module 128 displays the flow occupancy rates of the top M (>0) protocols having high occupancy rates for the total flows, the micro-flows, and the macro-flows on the protocol-radar coordinates with dots with reference to the flow occupancy rates stored in the traffic feature extractor 110, and the protocol-radar display module 128 connects the dots. The network-radar, the port-radar, the host-radar, and the protocol-radar will be described in detail with reference to FIGS. 2 to 7 hereinafter.

The traffic anomaly determination unit 130 determines whether a worm, a flash crowd, peer-to-peer (P2P) congestion, or a denial of service attack occurs with reference to the network-radar, the port-radar, the host-radar, and the protocol-radar displayed on the traffic status display unit 120, and the traffic anomaly determination unit 130 detects and reports the harmful or abnormal traffic that causes the worm, the flash crowd, the P2P congestion, or the denial of service attack. The abnormal status such as the worm attack or the denial of service and the traffic that causes the worm attack or the denial of service can be determined by the use of the radar for the micro-flow and will be described in detail with reference to FIGS. 2 to 7. The flash crowd or the P2P congestion, which is not the abnormal status but causes network failures and the traffic that causes the flash crowd or the P2P congestion, can be determined by the use of the radar for the macro-flow. For example, in case of a flash crowd, the macro-flow is centered at a specific port and a specific transmitting host address on the radar for the macro-flow. In case of P2P congestion, the macro-flow is centered at a specific transmitting/receiving host address on the radar.

As described above, the network status display device according to the embodiment of the present invention can automatically perform: calculating the occupancy rates for the total flows, the micro-flows, and the macro-flows with respect to each traffic feature; displaying the flow occupancy rates with respect to each traffic feature in the radial (radar) coordinate system; and determining whether the status is abnormal, detecting and reporting the harmful or abnormal traffic, by a program without user intervention. Accordingly, it is possible to observe a current network status quickly and accurately, and the network status display device automatically acts against the abnormal/harmful traffic by means of a program.

Figure 2:
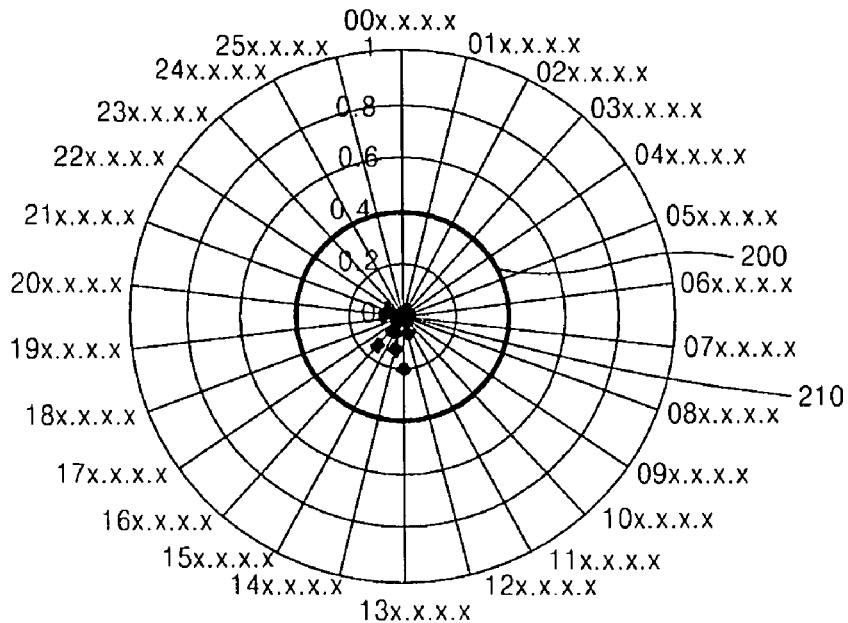
FIG. 2 is a graph showing an example of a network-radar which displays flow occupancy rates for micro-flows with respect to each of a plurality of network address sections, according to an embodiment of the present invention.

FIG. 2 is a graph showing an example of a network-radar which displays flow occupancy rates for micro-flows with respect to each of a plurality of network address sections, according to an embodiment of the present invention.

Referring to FIG. 2, in the network-radar, a total network address range is divided into 26 network address sections (00x.x.x.x~25x.x.x.x) to set radial coordinate axes, and the flow occupancy rates are set to the circular coordinate axes. Then, the flow occupancy rate in each network address section is displayed with a dot 210 on the network-radar coordinates.

In FIG. 2, a network-threshold value 200 of 0.4 (40%) is a reference value for determining whether the network status is abnormal with respect to the full range of the network addresses, and no traffic having a flow occupancy rate greater than the network-threshold value 200 exists.

Although the network-radars for the total flows and the macro-flows are not illustrated, the network-radars for the total flows and the macro-flows can be similar to that illustrated in FIG. 2.

Figure 3:
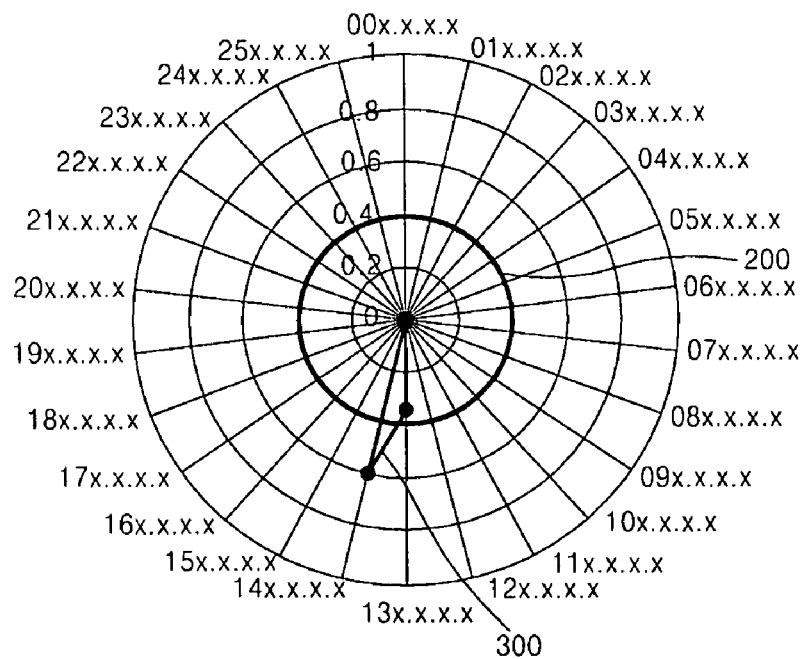
FIG. 3 is a graph showing another example of a network-radar which displays flow occupancy rates for micro-flows with respect to each of a plurality of network address sections, according to an embodiment of the present invention.

FIG. 3 is a graph showing another example of a network-radar that displays flow occupancy rates for micro-flows with respect to each of a plurality of network address sections, according to an embodiment of the present invention.

Referring to FIGS. 1 and 3, a plurality of traffic flows 300 occurs in a network address section 14x.x.x.x and the flow occupancy rate is greater than the first network threshold value 200. In addition, the sum of the flow occupancy rates of the traffic flows that occur in the network address sections 14x.x.x.x and 13x.x.x.x is greater than 90%, and thus a network anomaly occurs in both network address sections 14x.x.x.x and 13x.x.x.x. The traffic anomaly determination unit 130 can report the abnormal status of the network. For example, the traffic anomaly determination unit 130 may report that the attack traffic is caused by an automatic network attack system or the excessive traffic is caused by a worm. The traffic anomaly determination unit 130 can report the abnormal status of the network in detail by using the port-radar, the host-radar and the protocol-radar together. In addition, the traffic anomaly determination unit 130 additionally sets a plurality of threshold values greater than the first network threshold value 200, the threshold values being reference values for determining the level of abnormality of the abnormal status of the network. For example, when the flow occupancy rate in a specific network address section is greater than first, second or third network threshold values by setting a flow occupancy rate of 0.6 as the second network threshold value and setting a flow occupancy rate of 0.8 as the third network threshold value, the levels of warning are different based on whichever threshold value the flow occupancy rate exceeds. That is, the higher the flow occupancy rate in a specific network address section is, the stronger a generated warning message is. In addition, the network-radar display module 122 enables a user to intuitively recognize the level of abnormality of the abnormal status of the network by displaying the first, the second and the third network threshold values on the network-radar.

Figure 4A:
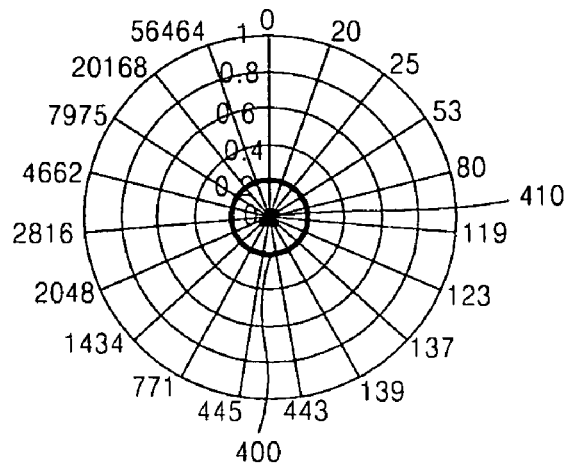
FIGS. 4A to 4C show examples of a port-radar and a host-radar for micro-flows, according to embodiments of the present invention.
Figure 4B:
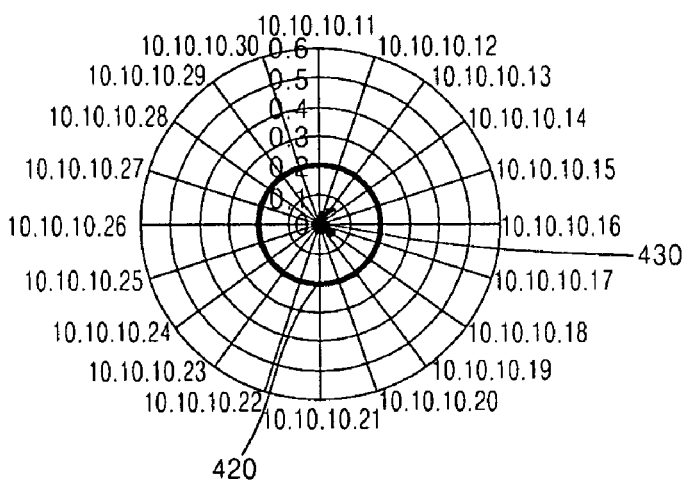
Figure 4C:
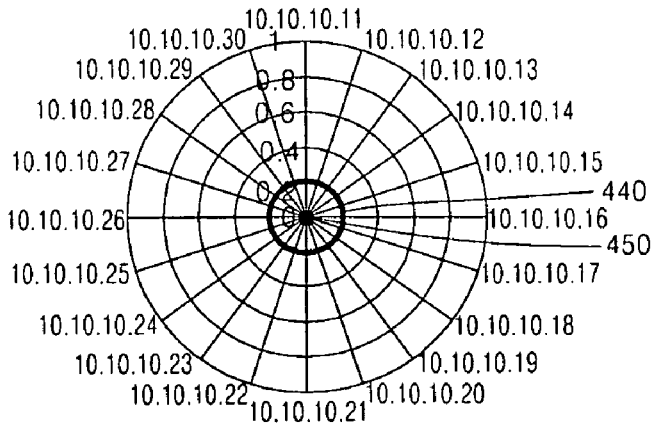

FIGS. 4A to 4C show examples of port-radars and host-radars for the micro-flows, according to embodiments of the present invention. Specifically, in FIG. 4A, the traffic flow occupancy rates of the top 19 ports having high occupancy rates are displayed on the port-radar by the use of the port-radar display module 124 (refer to FIG. 1). In FIG. 4B, the traffic flow occupancy rates of the top 20 transmission host addresses having high occupancy rates are displayed on the host-radar by the host-radar display module 126 (refer to FIG. 1), and in FIG. 4C, the traffic flow occupancy rates of the top 20 receiving host addresses having high occupancy rates are displayed on the host-radar by the host-radar display module 126 (refer to FIG. 1).

Referring to FIG. 4A, in the port-radar, the top 19 ports having high occupancy rates are set to the radial coordinate axes, and the flow occupancy rates are set to the circular coordinate axes, similar to the network-radars illustrated in FIGS. 2 and 3. The flow occupancy rate of each port is displayed with a dot 410 on the port-radar coordinates. In FIG. 4A, no traffic having a flow occupancy rate of the top 19 ports greater than the first port-threshold value 400 of 0.2 (20%) for determining whether the network status is abnormal exists.

Referring to FIG. 4B, in the host-radar based on the transmission addresses, the top 20 transmitting addresses having high occupancy rates are set to the radial coordinate axes, and the flow occupancy rates are set to the circular coordinate axes. Then, the flow occupancy rate of each transmitting address is displayed with a dot 430 on the host-radar coordinates based on the transmitting host addresses. In FIG. 4B, no traffic having a flow occupancy rate of the top 20 transmission addresses greater than the first host-threshold value 420 of 0.1 (10%) for determining whether the network status is abnormal exists.

Referring to FIG. 4C, in the host-radar based on the receiving addresses, the top 20 receive addresses having high occupancy rates are set to the radial coordinate axes, and the flow occupancy rates are set to the circular coordinate axes. Then, the flow occupancy rate of each receiving address is displayed with a dot 440 on the host-radar coordinates based on the receiving host addresses. In FIG. 4C, no traffic having a flow occupancy rate of the top 20 receiving addresses greater than the first host-threshold value 420 of 0.1 (10%) for determining whether the network status is abnormal exists.

On the other hand, though the port-radars and host-radars for the total flows and the macro-flows are not illustrated, the port-radars and host-radars for the total flows and the macro-flows can be similar to those illustrated in FIGS. 4A to 4C.

Figure 5A:
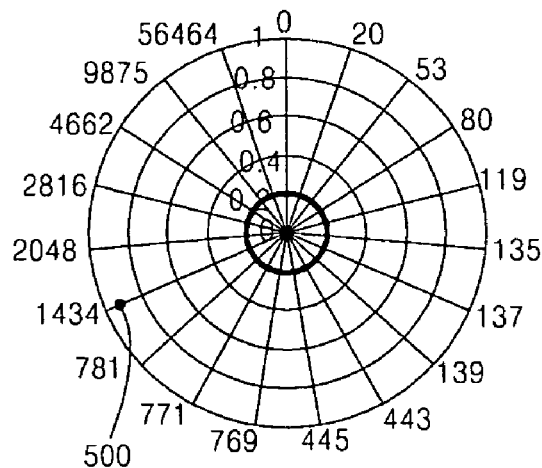
FIGS. 5A to 5C show other examples of a port-radar and a host-radar for micro-flows, according to embodiments of the present invention.
Figure 5B:
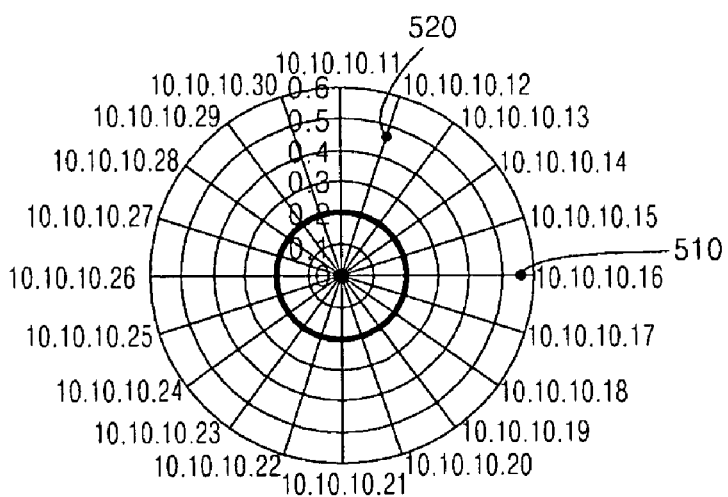
Figure 5C:
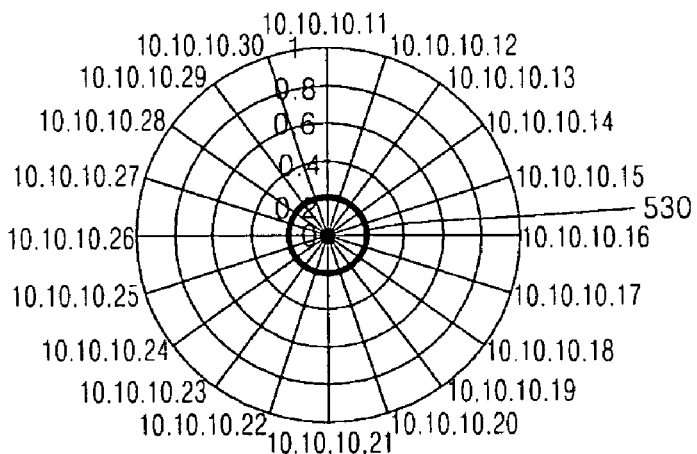

FIGS. 5A to 5C show other examples of a port-radar and a host-radar with respect to micro-flows, according to embodiments of the present invention. While the port-radar and the host-radar of the normal traffic status are shown in FIGS. 4A to 4C, the port-radar and the host-radar of the traffic status in cases where the worm attack is carried out using the specific port of the specific host are shown in FIGS. 5A to 5C. As described in FIGS. 4A to 4C, the traffic flow occupancy rates of the top 19 ports having high occupancy rates are displayed on the port-radar in FIG. 5A, the traffic flow occupancy rates of the top 20 transmission host addresses having high occupancy rates are displayed on the host-radar in FIG. 4B, and the traffic flow occupancy rates of the top 20 receive host addresses having high occupancy rates are displayed on the host-radar in FIG. 4C.

Referring to FIG. 5A, the flow occupancy rate of the port 1434 among the top 19 ports having high occupancy rates is greater than 0.9 (90%), which is greater than the first port threshold value of 0.2 (20%), and is displayed with a dot 500 on the port-radar.

Referring to FIG. 5B, the flow occupancy rates of the specific hosts 10.10.10.12 and 10.10.10.16 among the top 20 transmission host addresses having high occupancy rates are greater than 0.9 (90%), which is greater than the first host threshold value of 0.2 (20%), and are displayed with dots 510 and 520 on the host-radar based on the transmitting host addresses differently from those of other transmitting addresses.

Referring to FIG. 5C, the flow occupancy rates of all of the top 20 receiving host addresses having high occupancy rates are not greater than the first threshold value of 0.2 (20%) and are displayed with dots 530 as same as a graph of the normal status of the network due to the feature of the worm.

The traffic anomaly determination unit 130 (refer to FIG. 1) reports the abnormal state that the worm attack is caused from the specific hosts corresponding to the transmitting host addresses 10.10.10.12 and 10.10.10.16 through the port of 1434, by the use of FIGS. 5A to 5C. The traffic anomaly determination unit 130 reports the abnormal status of the network in detail by using the port-radar, the host-radar and the protocol-radar together.

Figure 6A:
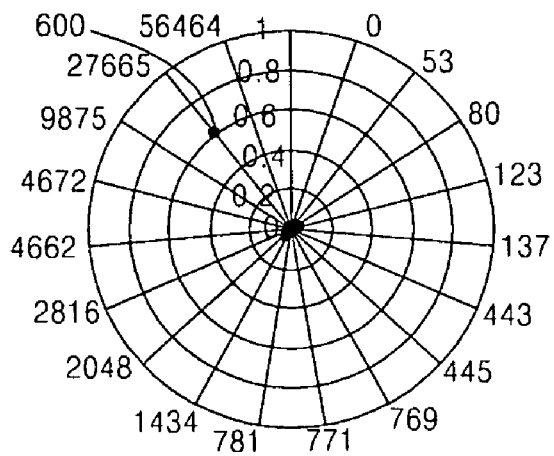
FIGS. 6A to 6C show other examples of a port-radar and a host-radar for micro-flows, according to embodiments of the present invention.
Figure 6B:
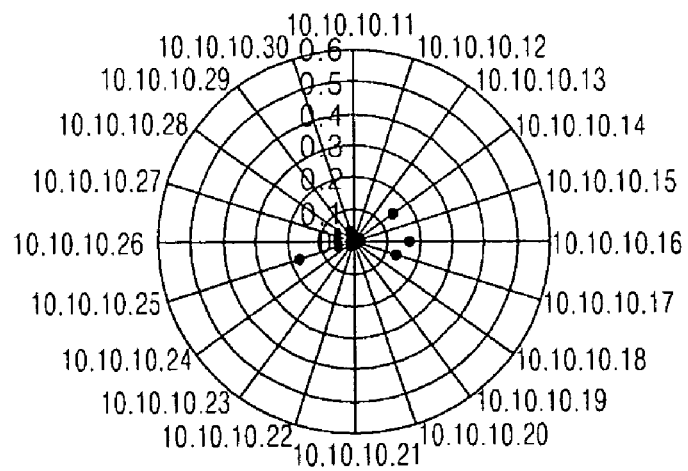
Figure 6C:
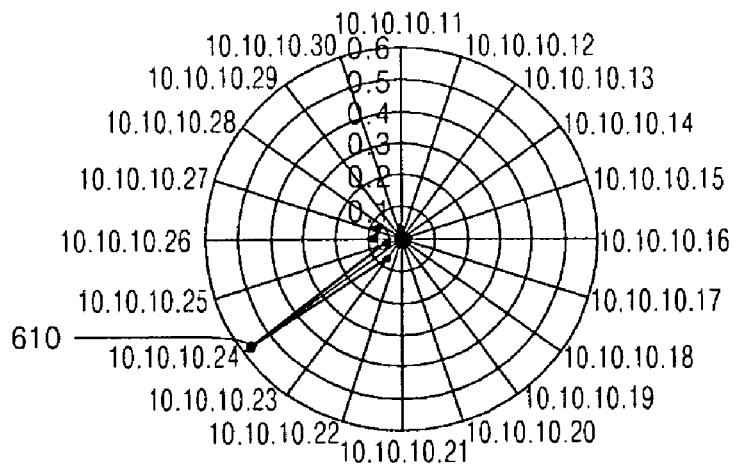

FIGS. 6A to 6C show other examples of a port-radar and a host-radar for micro-flows, according to embodiments of the present invention. The port-radar and the host-radar of the traffic status in cases where the denial of service attack is applied to a specific destination from a specific host through a specific port are shown in FIGS. 6A to 6C. As described in FIGS. 4A to 4C, the traffic flow occupancy rates of the top 19 ports having high occupancy rates are displayed on the port-radar in FIG. 6A, the traffic flow occupancy rates of the top 20 transmission host addresses having high occupancy rates are displayed on the host-radar in FIG. 6B, and the traffic flow occupancy rates of the top 20 receive host addresses having high occupancy rates are displayed on the host-radar in FIG. 6C.

Referring to FIG. 6A, the flow occupancy rate of the port 27665 among the top 19 ports having high occupancy rates is greater than 0.6 (60%), which is greater than the first port threshold value of 0.2 (20%), and is displayed with a dot 600 on the port-radar.

Referring to FIG. 6B, the flow occupancy rates of the specific hosts 10.10.10.15, 10.10.10.16, 10.10.10.17 and 10.10.10.25 causing the attack among the top 20 transmitting host addresses having high occupancy rates are greater than the first host threshold value of 0.1 (10%) and are displayed with dots on the host-radar based on the transmission host addresses differently from those of other transmission addresses.

Referring to FIG. 6C, the flow occupancy rate of the specific host 10.10.10.24 to be attacked among the top 20 receiving host addresses having high occupancy rates is greater than the first threshold value of 0.1 (10%) and is displayed with dots 610 on the host-radar based on the receiving host addresses.

The traffic anomaly determination unit 130 (refer to FIG. 1) reports the abnormal state that the denial of service attack is caused from the specific hosts corresponding to the transmitting host addresses 10.10.10.15, 10.10.10.16, 10.10.10.17 and 10.10.10.25 through the port of 27665 to the specific host corresponding to the receiving host address of 10.10.10.24, by the use of FIGS. 6A to 6C. The traffic anomaly determination unit 130 reports the abnormal status of the network in detail by using the port-radar, the host-radar, and the protocol-radar, together.

The traffic anomaly determination unit 130 additionally sets a plurality of port threshold values greater than the first port threshold value and a plurality of host threshold values greater than the first host threshold value, which are reference values for determining the level of abnormality of the abnormal status of the network. The levels of warning are different based on whichever threshold value the flow occupancy rate of the specific port and the specific host exceeds. That is, the higher the threshold value that the flow occupancy rate of the specific port and the specific host reaches, the stronger a generated warning message is. In addition, the port-radar display module 124 and the host-radar display module 126 enable a manager to intuitively recognize the level of abnormality of the abnormal status of the network by displaying the additional threshold values on the port-radar and the host-radar.

Figure 7:
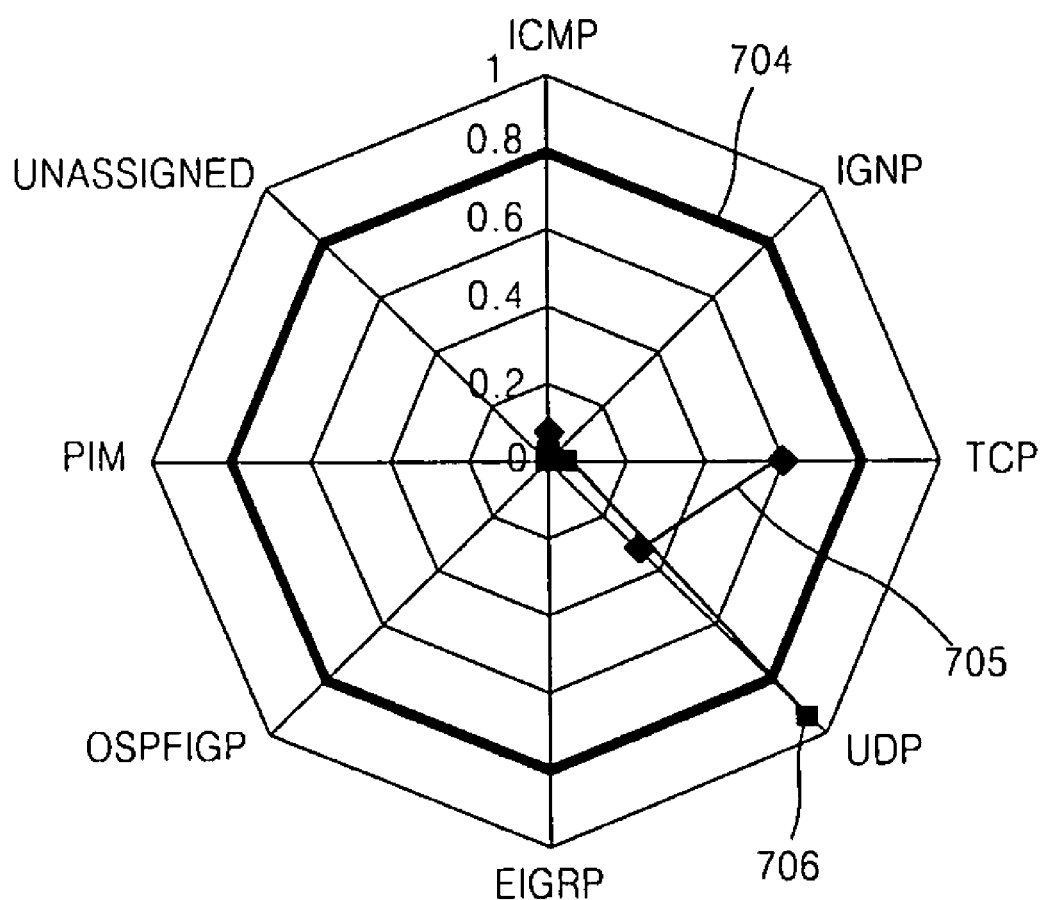
FIG. 7 shows an example of a protocol-radar for micro-flows with respect to protocol features, according to an embodiment of the present invention.

FIG. 7 shows an example of a protocol-radar for micro-flows with respect to protocol features, according to an embodiment of the present invention. In FIG. 7, each protocol occupancy rate in the normal status of the network is displayed with a dot ■, and each protocol occupancy rate in the abnormal status of the network is displayed with a dot ■, together. As shown in FIG. 7, in the protocol-radar in the normal status of the network, the occupancy rates of the transmission control protocol (TCP) and the user datagram protocol (UDP) are balanced and are not greater than the first protocol threshold value of 0.6 (60%) that is a reference value for determining whether the network status is abnormal. However, when the traffic is centered at the UDP and the occupancy rate of the UDP is abnormally greater than that of the other protocols, the traffic anomaly determination unit 130 reports the abnormal status of the network caused by the aforementioned anomaly. The traffic anomaly determination unit 130 reports the abnormal status of the network in detail by using the port-radar, the host-radar and the protocol-radar together. In addition, the traffic anomaly determination unit 130 additionally sets a plurality of threshold values greater than the first protocol threshold value of 0.6 (60%), which are reference values for determining the level of abnormality of the abnormal status of the network. The levels of warning are different according to whichever threshold value than the flow occupancy rate of the specific protocol exceeds. That is, the higher the threshold value that the flow occupancy rate of the specific protocol reaches, the stronger a generated warning message is. In addition, the protocol-radar display module 128 enables a manager to intuitively recognize the level of abnormality of the abnormal status of the network by displaying the additional threshold values on the protocol-radar.

As described above, the network status display device and the network status display method using the traffic flow-radar according to embodiments of the present invention can determine whether an anomaly deteriorating the network performance exists and detect harmful traffic or abnormal traffic which generates the aforementioned anomaly by using the flow occupancy rate with respect to each traffic feature such as the network address, the host address, the protocol or the port. Further, an action against the abnormal state can be performed without a user's intervention by automatically performing these procedures by program.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A network status display device using a traffic pattern map, the device comprising:

a traffic feature extractor calculating flow occupancy rates for total flows, micro-flows and macro-flows with respect to each of a plurality of traffic features with reference to traffic information for each traffic feature such as a network address, a port, a transmitting/receiving host address or a protocol collected by an external traffic information collector, and storing the calculation result wherein micro-flows are those flows that exist for periods less than a predetermined time and macro-flows are those flows that exist for periods longer than the predetermined time;

a traffic status display unit displaying the flow occupancy rates with respect to each traffic feature calculated and stored in the traffic feature extractor on a radar map with dots with respect to each traffic feature wherein the radar map has radial coordinate axes which indicate network addresses and circular coordinate axes which indicate threshold values for determining whether the network status is abnormal; and a traffic anomaly determination unit determining whether a network status is abnormal with reference to the radar map with respect to each traffic feature, detecting and reporting harmful traffic or abnormal traffic which generates the abnormal network status.

2. The device of claim 1, wherein the traffic feature extractor calculates the flow occupancy rates for the macro-flows with respect to each traffic feature by subtracting the flow occupancy rates for the micro-flows with respect to each traffic feature from the flow occupancy rates for the total flows with respect to each traffic feature.

3. The device of claim 1, wherein, in cases of the ports, the transmitting/receiving host addresses and the protocols, the traffic feature extractor stores only the flow occupancy rates of the top N (>0) ports, the top M (>0) transmitting/receiving host addresses, and the top P (>0) protocols having high occupancy rates.

4. The device of claim 1, wherein the traffic status display unit comprises: a network-radar display module displaying the flow occupancy rates for the total flows, the micro-flows, and the macro-flows with respect to corresponding network address sections with dots on the network-radar in which a total network address range is divided into n network address sections to set radial coordinate axes, and the flow occupancy rates are set to circular coordinate axes with reference to the flow occupancy rates stored in the traffic feature extractor; a port-radar display module displaying the flow occupancy rates for the total flows, the micro-flows, and the macro-flows with respect to the corresponding ports with dots on the port-radar in which the top N ports having high occupancy rates are set to radial coordinate axes, and the flow occupancy rates are set to circular coordinate axes, with reference to the flow occupancy rates stored in the traffic feature extractor; a host-radar display module displaying the flow occupancy rates for the total flows, the micro-flows, and the macro-flows with respect to the corresponding transmitting/receiving host address with dots on the transmitting/receiving host-radar in which the top P transmitting/receiving host addresses having high occupancy rates are set to radial coordinate axes, and the flow occupancy rates are set to circular coordinate axes, with reference to the flow occupancy rates stored in the traffic feature extractor; and a protocol-radar display module displaying the flow occupancy rates for the total flows, the micro-flows, and the macro-flows with respect to the corresponding protocols with dots on the protocol-radar in which the top M protocols having high occupancy rates are set to radial coordinate axes, and the flow occupancy rates are set to circular coordinate axes, with reference to the flow occupancy rates stored in the traffic feature extractor.

5. The device of claim 4, wherein each of the network-radar display module, the port-radar display module, the host-radar display module, and the protocol-radar display module displays first threshold values that are the flow occupancy rates as reference values for determining whether the network status is abnormal on the radars to allow a user to recognize the network status intuitively and displays a plurality of threshold values greater than the first threshold values that are reference values for determining the level of abnormality of the abnormal status of the network on the radars to allow the user to recognize the network status intuitively.

6. The device of claim 5, wherein the traffic anomaly determination unit reports the level of abnormality of the abnormal status of the network by comparing the flow occupancy rate displayed on each of the radars with the first threshold value and the threshold values when reporting the abnormal status of the network.

7. A network status display method using a traffic pattern map, the method comprising:
(a) calculating flow occupancy rates for total flows, micro-flows and macro-flows with respect to each of a plurality of traffic features with reference to traffic information for each traffic feature such as a network address, a port, a transmitting/receiving host address or a protocol collected by an external traffic information collector, and storing the calculation result wherein micro-flows are those flows that exist for period less than a predetermined time and macro-flows are those flows that exist for periods longer than the predetermined time;

(b) displaying on a traffic status display unit the flow occupancy rates with respect to each traffic feature stored in (a) on a radar map with dots for each traffic feature, wherein the radar map has radial coordinate axes which indicate network addresses and circular coordinate axes which indicate threshold values for determining whether the network status is abnormal; and
(c) determining whether a network status is abnormal with reference to the radar map for each traffic feature, and detecting and reporting harmful traffic or abnormal traffic that generates the abnormal network status.

8. The method of claim 7, wherein, in (a), in cases of the ports, the transmitting/receiving host addresses and the protocols, only the flow occupancy rates of the top N (>0) ports, the top M (>0) transmitting/receiving host addresses, and the top P (>0) protocols having high occupancy rates are stored.

9. The method of claim 7, wherein (b) comprises: (b_1) displaying the flow occupancy rates for the total flows, the micro-flows, and the macro-flows with respect to corresponding network address sections with dots on a network-radar in which a total network address range is divided into n network address sections to set radial coordinate axes, and the flow occupancy rates are set to circular coordinate axes with reference to the flow occupancy rates stored in (a); (b_2) displaying the flow occupancy rates for the total flows, the micro-flows, and the macro-flows with respect to the corresponding ports with dots on a port-radar in which the top N ports having high occupancy rates are set to the radial coordinate axes, and the flow occupancy rates are set to the circular coordinate axes, with reference to the flow occupancy rates stored in (a); (b_3) displaying the flow occupancy rates for the total flows, the micro-flows, and the macro-flows with respect to the corresponding transmitting/receiving host address with dots on the transmitting/receiving host-radar in which the top P transmitting/receiving host addresses having high occupancy rates are set to the radial coordinate axes, and the flow occupancy rates are set to the circular coordinate axes, with reference to the flow occupancy rates stored in (a); and (b_4) displaying the flow occupancy rates for the total flows, the micro-flows, and the macro-flows with respect to the corresponding protocols with dots on a protocol-radar in which the top M protocols having high occupancy rates are set to the radial coordinate axes, and the flow occupancy rates are set to the circular coordinate axes, with reference to the flow occupancy rates stored in (a).

10. The method of claim 7, further comprising displaying first threshold values that are the flow occupancy rates as reference values for determining whether the network status is abnormal on the radars to allow a user to recognize the network status intuitively and displaying a plurality of threshold values greater than the first threshold values that are reference values for determining the level of abnormality of the abnormal status of the network on the radars to allow the user to recognize the network status intuitively,
wherein the level of abnormality of the abnormal status of the network is reported when reporting the abnormal status of the network in (c).

* * * * *